March 20, 1945.  C. H. PEARCE  2,371,977
COMBINATION TOOL
Filed April 2, 1943
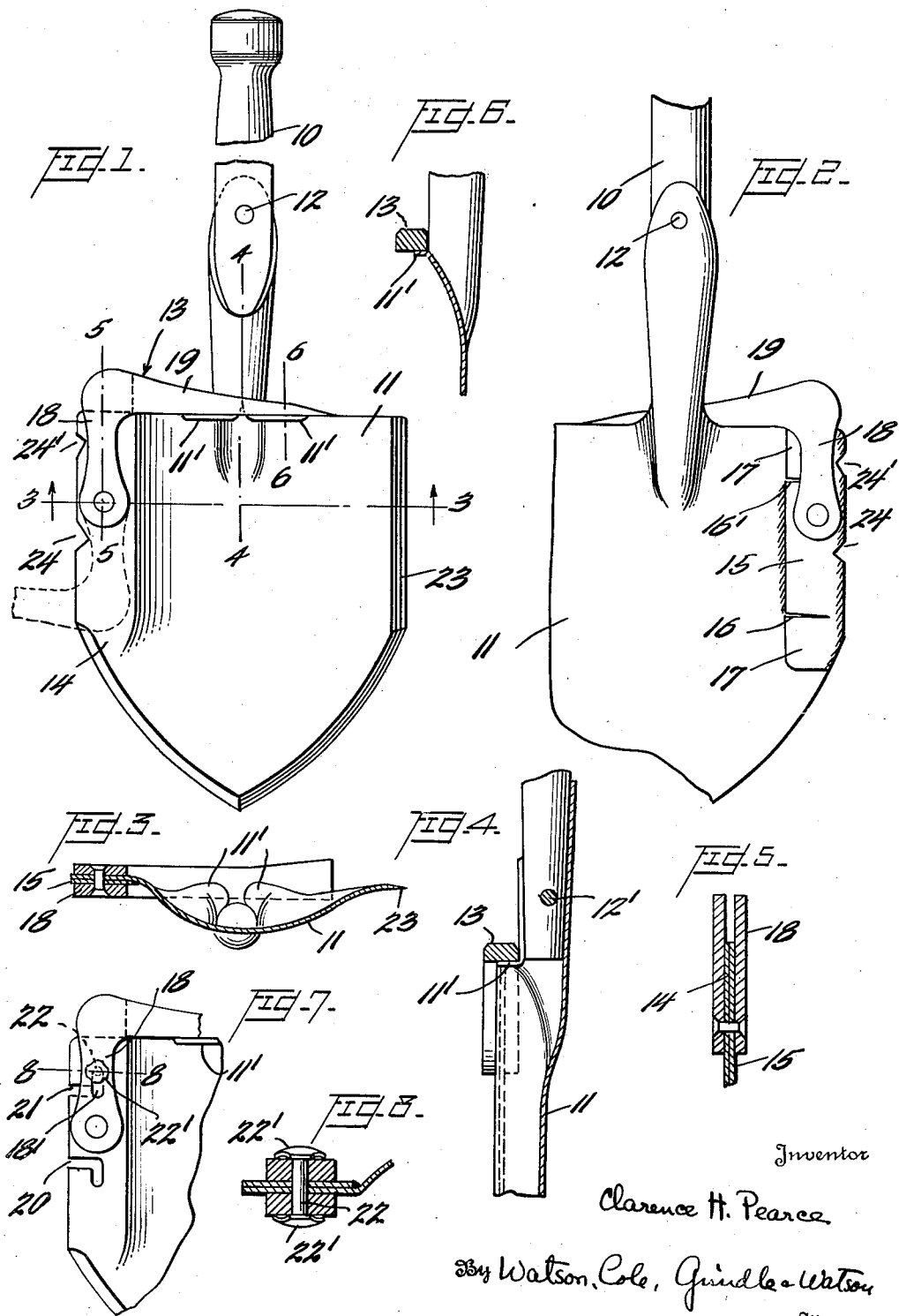
Inventor
Clarence H. Pearce
By Watson, Cole, Grindle & Watson
Attorneys Patented Mar. 20, 1945

2,371,977

UNITED STATES PATENT OFFICE 2,371,977

COMBINATION TOOL

Clarence H. Pearce, Hyattsville, Md.

Application April 2, 1943, Serial No. 481,630

6 Claims. (Cl. 7—1)

This invention relates to combination hand tools, and more particularly to a hand tool adapted for use by military personnel in the field, for digging trenches, "foxholes" and the like, throwing up revetments, and for general utility. The utility of the present invention, however, is not limited to military purposes, but extends to many civilian and general fields, such as gardening, clearing brushland, and so forth.

The general object of the invention is to provide a combination pick and shovel embodied in a single tool of relatively small size and little weight, such as may be easily carried in the hand or secured to the person in any suitable manner, and which may be easily and quickly adapted either to picking or shoveling, and may be used with one hand if necessary.

A further object is the provision of a tool such as described above, in which the pick element or blade is movable into and out of operative position, and capable of being firmly secured in either position, the pick blade being entirely out of the way when in inoperative position, so as not to interfere with the use of the tool as a shovel.

Other objects are the provision of means whereby a tool such as described may be used, in case of necessity, as a cutting tool in lieu of an axe, or as a wire cutting tool, or both.

Other and further features and objects of the invention will be more apparent to those skilled in the art upon a consideration of the accompanying drawing and following specification wherein are disclosed several embodiments of the invention with the understanding that these may be combined and/or modified to the extent permitted by the scope of the appended claims without departing from the spirit of the invention.

In said drawing:

Figure 1 is a front elevation of a tool constructed according to the invention, showing the pick blade in alternative positions;

Figure 2 is a fragmentary rear elevation;

Figure 3 is a section on line 3—3 of Figure 1;

Figure 4 is a section on line 4—4 of Figure 1;

Figure 5 is a section on line 5—5 of Figure 1;

Figure 6 is a section on line 6—6 of Figure 1;

Figure 7 is a fragmentary front elevation showing a modification of the invention; and Figure 8 is a section on line 8—8 of Figure 7.

Referring to the drawing, it will be seen that the tool comprises, generally, a handle 10, shovel blade 11 firmly secured to the handle as by rivets 12, 12' and a pick blade 13 pivotally mounted on one lateral edge 14 of the shovel blade 11. The handle 10 may be of wood, as usual, but is somewhat shorter than the usual shovel handle, for easy portability and also in order that the tool may conveniently be wielded with one hand. For the latter reason, also, the handle is preferably formed with an enlargement or knob on the distal end, so that the tool can be held against centrifugal force when swung as an axe.

It will be noted that the shovel blade is constructed in an unusual manner in that the handle is secured on the front or concave surface of the blade, rather than the back or convex surface, as is customary. This construction serves the dual function of providing clearance for the pick blade 13 when in inoperative position, and (as best seen in Figure 4) of straightening the longitudinal axis of the entire tool, which renders it more suitable for use as a pick or as an axe, and also more suitable for attachment to a soldier's pack. On either side of the handle, small horizontal flanges 11' are formed to extend rearwardly from the upper edge or heel of the blade 11, providing a seat for the pick blade 13 when in inoperative position.

The edge 14 of the shovel blade is reinforced by a steel strip 15 (Figure 2) which is welded to the rear side of the blade 11 adjacent the edge 14. The welding extends along the entire outer edge of the strip 15, but is confined to the central portion of the inner edge of the strip, the strip being slit partway toward the outer edge at 16, 16', so that the inner edges of the end portions 17, 17' are free from the blade proper, for a purpose to be described.

The pick blade 13 is L-shaped, comprising a base portion 18 adapted to lie parallel to and in contact with the edge 14 of the shovel blade 11, and a distal portion 19 disposed at a right angle thereto. The base portion 18 is bifurcated, one furcation thereof overlapping either side of the edge 14 of the shovel blade whenever the pick blade is fully in operative or inoperative position. In either case, the bifurcated base portion 18 frictionally engages and grips the edge 14 of the shovel blade and the reinforcing strip 15. If a stronger frictional grip is desired, the free portions 17, 17' of the reinforcing strip may be slightly raised from the blade 11, by bending, thus enhancing said frictional engagement.

In the modification illustrated in Figures 7 and 8, a different means of engagement is employed. In this case, the edge 14 of the shovel blade is provided with L-shaped slots 20, 21, adapted to receive a slidable stud 22 carried in a closed slot 18' of the base portion 18 of the pick blade. The stud 22 is provided at each end with a head 22' having slight frictional engagement with the adjacent surface of the pick blade, whereby when the stud 22 is seated in the bottom of a slot 20 or 21, the pick blade is locked in place beyond any ordinary chance of accidental displacement.

The edge 23 of the shovel blade 11, opposite the edge 14, is preferably sharpened as seen in Figures 1 and 3, permitting the tool to be used as an axe for cutting small bushes and roots. Also, the edge 14 and reinforcing strip 15 may be notched as at 24, 24', in either or both forms of the invention, for cooperation with the base 18 of the pick blade for cutting wire, vines and the like.

Having thus described the invention, what is claimed as new and desired to be secured by Letters Patent is:

1. A combination tool comprising a handle, a shovel blade secured thereto, and a pick blade pivoted adjacent one edge of said shovel blade and movable alternatively into operative and inoperative positions, said pick blade comprising a base portion adapted to lie parallel to and in contact with said edge of said shovel blade in either position of said pick blade, and a distal portion disposed substantially at a right angle to said base portion and adapted to extend substantially perpendicular to said shovel blade edge when in operative position, and to lie parallel to and in contact with the heel of said shovel blade when in inoperative position.

2. A combination tool according to claim 1, said base portion of said pick blade being bifurcated, whereby said base portion partially telescopes with and overlaps said shovel blade in either said position of said pick blade.

3. A combination tool according to claim 1, said base portion of said pick blade being bifurcated, whereby said base portion partially telescopes with and overlaps said shovel blade in either said position of said pick blade, said base portion having a frictional engagement with said shovel blade edge in either said position.

4. A combination tool comprising a handle, a shovel blade secured thereto, and a pick blade pivoted adjacent one edge of said shovel blade and movable alternatively into operative position in which a portion of said pick blade extends substantially perpendicular to said edge, or inoperative position in which said pick blade lies against the periphery of said shovel blade, said shovel blade being provided with L-shaped slots extending inwardly from said edge, and a movable stud associated with said pick blade for engagement with said slots for securing said pick blade in either of said positions.

5. A combination tool according to claim 1, said base portion of said pick blade being bifurcated, whereby said base portion partially telescopes with and overlaps said shovel blade in either said position of said pick blade, said shovel blade being provided with a notch adapted to cooperate with said base portion of said pick blade to sever filaments such as wire and the like.

6. A combination tool comprising a handle, a shovel blade secured thereto, and a pick blade pivoted adjacent one edge of said shovel blade and movable alternatively into operative and inoperative positions, said pick blade comprising a base portion adapted to lie parallel to and in contact with said edge of said shovel blade in either position of said pick blade, and a distal portion disposed substantially at a right angle to said base portion and adapted to extend substantially perpendicular to said shovel blade edge when in operative position, and to lie parallel to and in contact with the heel of said shovel blade when in inoperative position, and cooperating means on said shovel blade and pick blade for securing the latter in either of said positions.

CLARENCE H. PEARCE.